G. FAST.
COUPLING FOR SHAFTING.
APPLICATION FILED MAR. 24, 1919.
1,356,860.
Patented Oct. 26, 1920.
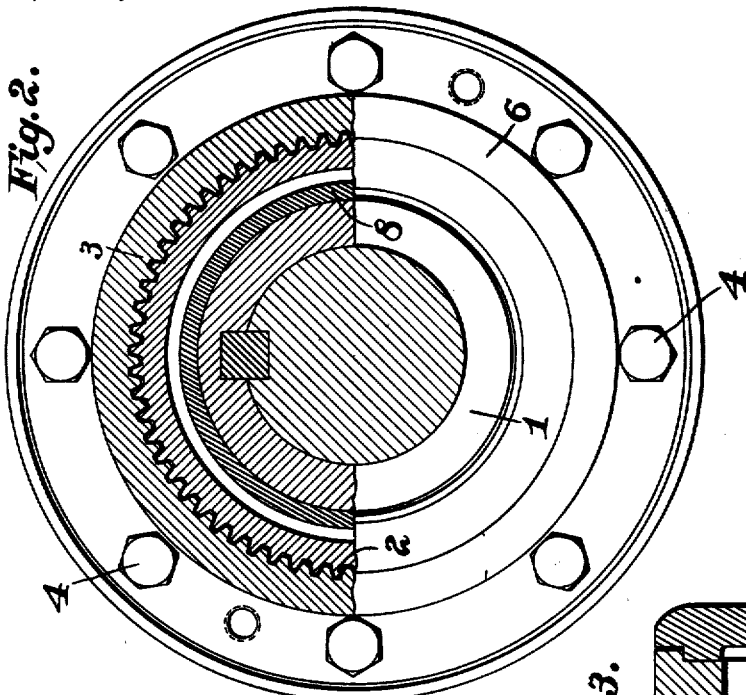
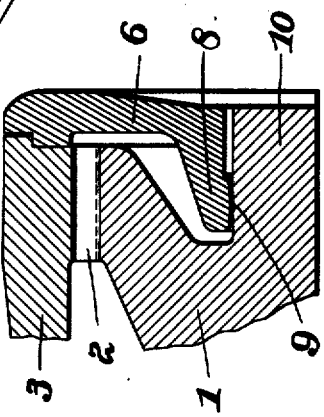
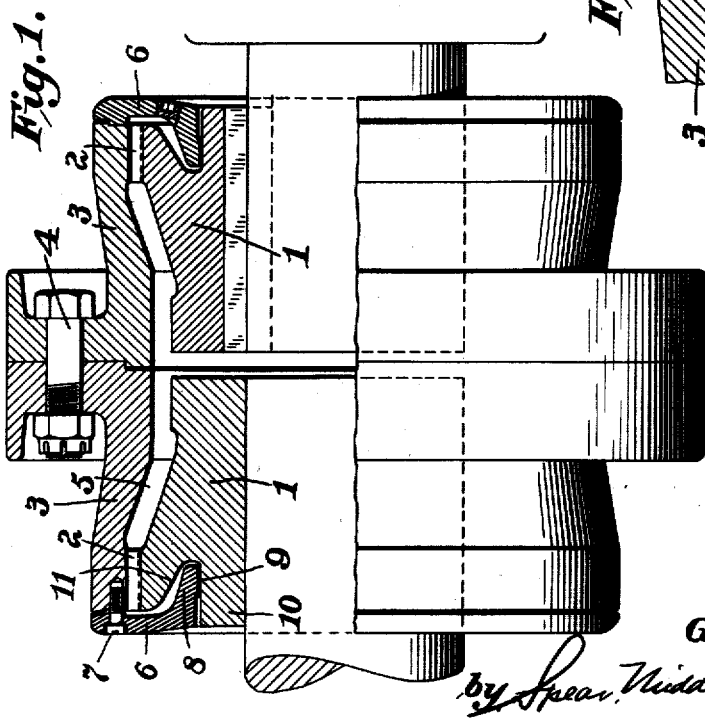
Inventor:
Gustave Fast,
by Spear, Middleton, Donaldson & Spear
Attys.

UNITED STATES PATENT OFFICE.

GUSTAVE FAST, OF MOUNT WASHINGTON, MARYLAND, ASSIGNOR TO THE BARTLETT HAYWARD COMPANY, OF BALTIMORE, MARYLAND, A CORPORATION OF MARYLAND.

COUPLING FOR SHAFTING.

1,356,860.     Specification of Letters Patent.     Patented Oct. 26, 1920.

Application filed March 24, 1919. Serial No. 284,699.

*To all whom it may concern:*

Be it known that I, GUSTAVE FAST, a subject of the King of Sweden, and resident of Mount Washington, Maryland, have invented certain new and useful Improvements in Couplings for Shafting, of which the following is a specification.

The invention consists in the features and combination and arrangement of parts hereinafter described and particularly pointed out in the claims.

In the accompanying drawings:

Figure 1 is in part a central vertical sectional view through the coupling mounted upon the shaft ends.

Fig. 2 is a cross sectional view.

Fig. 3 is a detail sectional view of a part of the bearing ring member in its relation to the shaft member and the encircling member.

This coupling is designed to connect two shafts which are supposed to be held in their bearings in axial alinement but if through error of installation they are slightly out of line the coupling will take care of the error. It consists of two members 1 fixed to the ends of the shafts, each member having teeth at 2 meshing with teeth on the interior of the annular member 3 which surrounds the ends of the shafts and the members 1. This annular casing or member is formed in two parts connected by bolts 4 so that virtually it acts as one piece. The teeth of the members 1 and 3 have clearance between them as shown in the transverse sectional view and the space 5 between the annular casing and the members 1 is filled with a heavy lubricant.

At each end of the casing 3 a ring 6 is fixed by screws 7, said ring having an inwardly projecting flange 8 at its inner portion or edge, said flange extending coaxially with the axis of the shafts to be coupled. On its interior face the flange 8 is formed with a rounded seat at 9, which bears upon a cylindrical extension 10 of the member 1. A compact assemblage of these parts is afforded by forming a recess 11 in the end of the members 1 to receive the flange 8 with its curved bearing portion 9. Any error in the alinement of the shafting is divided between the two bearing rings 6, which may roll or tip slightly in relation to the heads or members 1 by reason of the rounded surfaces at 9 and the clearance at the teeth 2 compensates for these errors. The heavy lubricant is thrown by centrifugal force between the teeth and forms a cushion for the teeth to work upon. It will be noticed in this connection that the space 5 inclines outwardly so that under centrifugal force the heavy lubricant will be directed to the teeth and this lubricant will also reach the rounded bearings at 9. I do not limit myself to the means consisting of the teeth of the form and arrangement shown for interlocking the shaft members 1 and the surrounding sleeve or casing.

What I claim is:

1. A flexible coupling for shafts comprising members fixed to the shaft ends, a member encircling the shaft members and having driving means engaging therewith to impart rotary movement from one shaft to the other, said encircling member being capable of movement in a radial plane relative to the shaft members, and bearings independent of the driving means between the encircling member and the shaft members maintaining contact in all relative positions of the encircling member and shaft members, substantially as described.

2. In connection with the features of claim 1 arranging the said bearings at the outer ends of the encircling member and the outer ends of the shaft members, substantially as described.

3. In connection with the features of claim 1 forming the bearings on both the encircling member and the shaft members continuous to rock in a direction in the plane of the axis of the members, substantially as described.

4. In connection with the features of claim 1 engaging the encircling member with the shaft members by means of teeth or projections extending radially inward from the encircling members and radially outward from the shaft members, substantially as described.

5. In combination with the shafts and members secured at the ends thereof, an annular member encircling the shaft member, said members having teeth engaging each other by which rotary movement is imparted from one shaft to the other, a bearing between the annular member and the shaft members to allow movement of the members relative to each other while maintaining the teeth in engagement and means for supplying the teeth and bearing with lubricant and retaining the same in place, substantially as described.

6. In combination the shafts with members secured thereto, a member encircling the shaft member, and having means engaging complementary means on the shaft, members for imparting a rotary movement, said encircling member having at its ends a portion extending inwardly toward the shaft and provided with an annular bearing engaging a bearing on the shaft members by which the encircling member may rock in relation to the shaft members, said members having a chamber between them containing lubricant and communicating with the engaging means and with the rocking bearings to supply the same with lubricant, substantially as described.

7. In connection with the features of claim 6 the inwardly extending end portions serving as closures for the ends of said chamber, substantially as described.

8. In combination the shafts, members mounted thereon having recesses in their end faces, an encircling member interlocking with the shaft members to communicate rotary motion from one to the other and a bearing member on each end of the encircling member having a portion bearing on the wall of the recess and adapted to have rocking movement thereon, substantially as described.

9. In combination with the shafts and the members secured thereto, an encircling member having driving engagement with the shaft members but adapted to have movement transverse to its axis, ring shaped members secured to the ends of the encircling member and each having a flange projecting therefrom on its inner face, the shaft members having recesses in their end faces to receive the flanges, which flanges bear on the wall of the recess, substantially as described.

10. In combination with the shafts and the members secured thereon, an encircling member composed of two sections divided from each other transverse of the axis of the encircling member, rings at the ends of the encircling member secured thereto and recesses in the end of the shaft members receiving a portion of the rings which are adapted to bear with rocking movement on the walls of the recesses, substantially as described.

11. In combination the shafts, members secured thereon, each having an annular row of teeth at or near its end portion, an encircling member having an annular row of teeth within its end portions to engage the annular row of teeth of the shaft members, rings secured to the ends of the encircling member, said rings bearing upon portions of the shaft members to afford rocking movement of the encircling member transverse to its axis if the shafts become disalined, substantially as described.

12. In combination the shafts, members secured thereon, each having an annular row of teeth at or near its end portion, an encircling member having an annular row of teeth within its end portions to engage the annular row of teeth of the shaft members, rings secured to the ends of the encircling member, said rings bearing upon portions of the shaft members to afford rocking movement of the encircling member transverse to its axis if the shafts become disalined, a chamber between the encircling member and the shaft members communicating with the annular row of teeth, the said rings forming a closure to hold lubricant between themselves and the shaft members and between the annular rows of teeth, substantially as described.

13. In combination with the shafts, the members secured thereon, an encircling member, said encircling member and shaft members having interengaging portions, a chamber between said members inclining outwardly to direct lubricant within the chamber to the interengaging portions by centrifugal force and rings extending from the ends of the encircling member and bearing upon portions of the shaft members to have rocking movement thereon, substantially as described.

14. In combination with the shafts, members secured thereon, a member encircling and inclosing the said shaft members and having a continuous bearing at its end with the outer end portions of said shaft members respectively, allowing relative movement between them in a direction radially of the shafts, said encircling member having driving engagement with the shaft members.

15. In combination with the shafts, members secured thereon, a member encircling the shaft members and having portions reaching inwardly over the ends of the shaft members and bearing thereon to permit relative movement radially of one member in respect to another, said encircling member having driving engagement with the shaft members, substantially as described.

16. In combination with the shafts, members secured thereon, an encircling member having driving engagement with the shaft members and having portions at its ends forming end closures for the spaces between the encircling member and the shaft members, said portions having rocking bearing engagement with the said shaft members.

17. In combination with the shafts, members secured thereto, an encircling member having driving engagement with the shaft members and having rocking bearing engagement with the shaft members at a point outside of the driving bearings between the encircling member and shaft members, said rocking bearing forming a closure for the space between the encircling member and shaft members, substantially as described.

18. In combination in a coupling for shafts, member to be secured to the shafts, an encircling member, a driving connection between each shaft member and the encircling member, and ring-shaped walls or flanges located between the encircling member and the shaft members at points out beyond the said driving connection, said ring-shaped walls being supported by and having relatively movable engagement with the shaft members thus holding the encircling member in proper relation to the shaft members and allowing for disalinement of the shafts, substantially as described.

19. In combination in a coupling for shafts, members to be secured to the shafts, an encircling member, a driving connection between each shaft member and the encircling member, rings or flanges located between the encircling member and the shaft members at points out beyond the said driving connection, said rings or flanges being connected with the encircling member and having compensating engagement with the shaft members to allow for disalinement of the shafts and to hold lubricant within the encircling member, substantially as described.

20. In combination in a coupling for shafts to hold them in substantially axial alinement, a member encircling a shaft end, a member to be connected with one of the shafts, a drive connection beween said encircling member and the shaft member having clearance between them in a radial direction, a ring or flange at the end of the encircling member located out beyond the said driving connection and located between the same and the shaft member, said flange having compensating engagement with the shaft member to accommodate disalinement of the shafts, said encircling member being connected with the other shaft and said compensating engagement being maintained during all changes in the relative positions of the two shafts, substantially as described.

In testimony whereof I affix my signature.

GUSTAVE FAST.